United States Patent [19]

Shewmon

[11] Patent Number: 4,637,330

[45] Date of Patent: Jan. 20, 1987

[54] REINFORCED SEAM CONSTRUCTION

[76] Inventor: Daniel C. Shewmon, 1940 Byram Rd., Clearwater, Fla. 33515

[21] Appl. No.: 881,489

[22] Filed: Jul. 1, 1986

Related U.S. Application Data

[63] Continuation of Ser. No. 630,802, Jul. 13, 1984, abandoned.

[51] Int. Cl.⁴ .................. D05B 93/00; B63B 21/48
[52] U.S. Cl. .................. 112/417; 112/418; 112/262.1; 114/311; 150/55; 244/145
[58] Field of Search ............ 112/417, 418, 434, 440, 112/262.1; 114/311; 150/55; 244/145; 383/17, 24, 107

[56] References Cited

U.S. PATENT DOCUMENTS

| | | | |
|---|---|---|---|
| 2,746,699 | 5/1956 | Hart | 244/145 |
| 3,199,814 | 8/1965 | Frieder | 244/145 |
| 3,410,742 | 11/1968 | Anderberg | 2/275 |
| 3,434,681 | 3/1969 | Bockelmann | 114/311 |
| 4,399,969 | 8/1983 | Gargano | 244/145 |

FOREIGN PATENT DOCUMENTS

| | | | |
|---|---|---|---|
| 868775 | 4/1971 | Canada | 244/145 |
| 562309 | 6/1944 | United Kingdom | 244/145 |
| 576885 | 4/1946 | United Kingdom | 244/145 |

OTHER PUBLICATIONS

Brochure "Shewmon Sea Anchors & Drogues" ©1982 Shewmon, Inc.

Primary Examiner—Wm. Carter Reynolds
Attorney, Agent, or Firm—Dowell & Dowell

[57] ABSTRACT

A reinforced seam and method of sewing the seam for joining adjacent fabric panels in an assembled relationship using a conventional sewing machine wherein a first panel is folded over and stitched to a reinforcing cord which extends along at least a portion of the length of the seam after which an adjacent panel is folded over the stitched fold of the first panel and a second stitch is made through both panels and the reinforcing cord. The stitches are made so that all materials extend outwardly of the throat of the sewing machine thereby enabling numerous panels to be assembled in joined relationship to form such products as sea anchors, drogue chutes, parachutes and the like.

5 Claims, 8 Drawing Figures

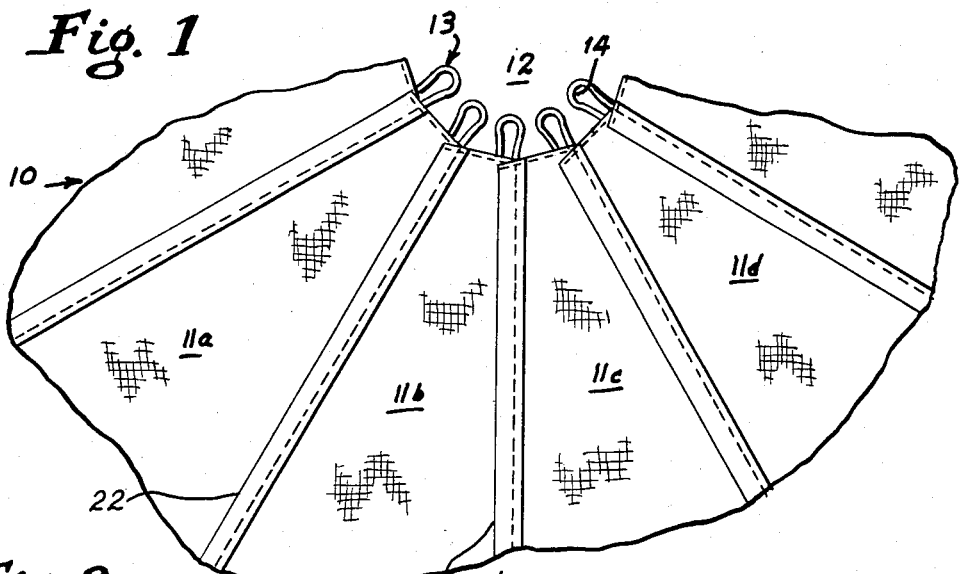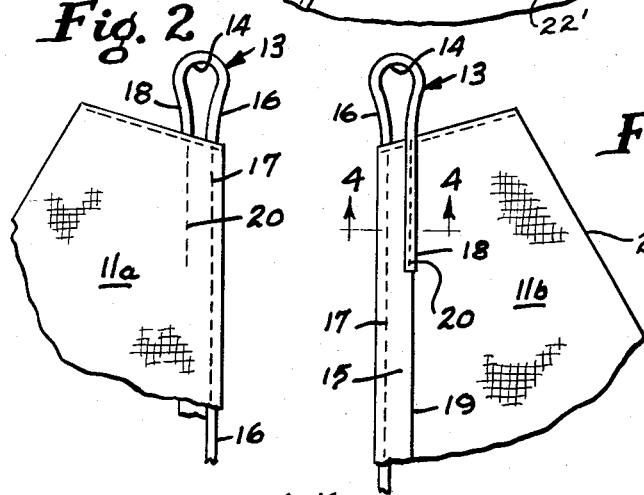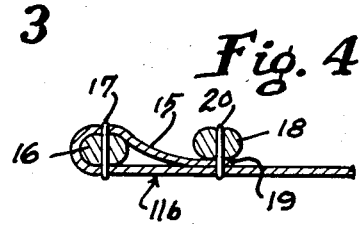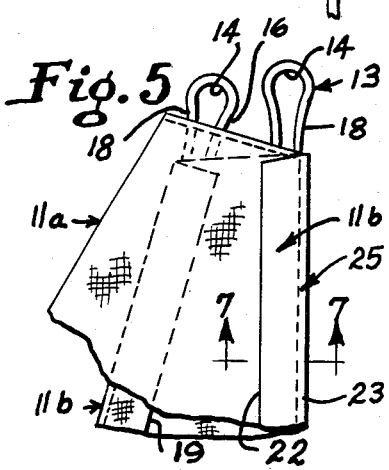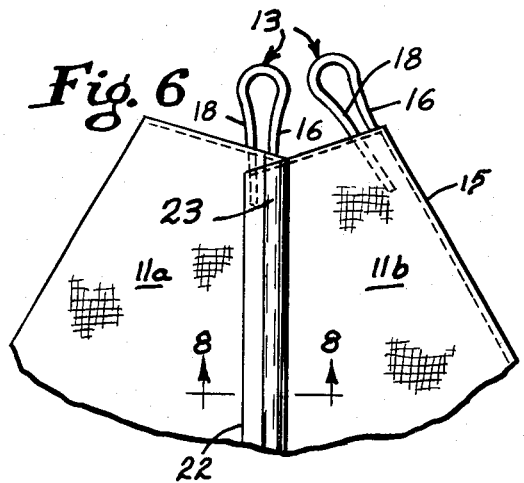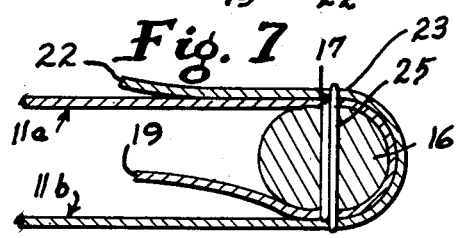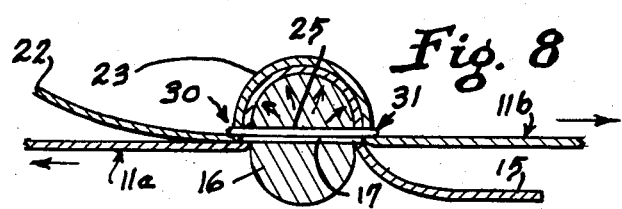

REINFORCED SEAM CONSTRUCTION

This application is a continuation of application Ser. No. 630,802, filed July 13, 1984, now abandoned.

HISTORY OF THE INVENTION

1. Field of the Invention

This invention is generally directed to a seam and method of sewing the seam to join adjacent fabric panels in assembled relationship and particularly to a reinforced seam having at least one cord like element extending therethrough in which adjacent panels are assembled and stitched to the cord in the seam in such a manner that all of the fabric is maintained in generally overlapping relationship during the sewing of the seam so that numerous panels may be added in end to end relationship using conventional sewing machines.

2. Background of the Invention

In the manufacture of sea anchors, drogue chutes, parachutes and the like, it is necessary to assemble a plurality of separate panel members in order to form a unified body which can withstand the stresses and forces applied thereto during deployment without failure of the seams between the panels. In order to impart added strength to the seams in prior art constructions, the threads which are used to stitch the panels together are selected from high tensile strength materials including Kevlar threads.

In the construction of parachutes, drogue chutes, sea anchors, tents, and other similar articles, it is also known to incorporate a cord material within the seams between adjacent material panels. In such prior uses, the cord material is bound by the stitching forming the seam so that the cord forms a bail to which support members are attached to suspended or connect other objects to the parachute, sea anchor, or drogue chute.

In prior art parachute constructions wherein a cord is incorporated into the seam joining separate panels, the stitching is generally performed on a commercial four needle machine where the stitches are made longitudinally with respect to the seam and the cord. Such stitching is placed in parallel relationship on either side of the cord so that the cord is bound between the overlapping material layers of adjoining panels of fabric and is not frictionally engaged therebetween. This construction permits some movement of the cord witin the area formed by the parallel seam.

In other prior art constructions where a cord material is incorporated for strength within a seam, the sewing is accomplished by joining adjacent panels by stitching the panels in overlapping relationship with the cord. Frequently such seams are formed using a zigzag type of stitch which crisscrosses the cord material and the overlapping fabrics of adjacent panels along the longitudinal extent of the cord.

The problem associated with the prior art methods of joining adjacent material or fabric panels is that when such panels are large in size, such as often encountered in manufacturing of parachutes or sea anchors wherein it may be necessary to join panels to create a resultant structure having diameters in excess of 10 to 30 feet, it is necessary to use specially designed sewing machines which can accommodate the bulk of material being assembled. This requires that an outlay of funds be made to acquire specialized machinery in order to accomplish the assembly or manufacture of large size drogue chutes, parachutes, sea anchors, and tents.

Some examples of the prior art include U.S. Pat. Nos. 3,434,681 to Bockelmann; 4,390,149 to Barnes et al.; and 4,399,969 to Gargano.

SUMMARY OF THE INVENTION

A reinforced seam construction and method of forming a reinforced seam to join a plurality of fabric members in assembled relationship in which an edge portion of a first fabric member is folded over and stitched to a reinforcing cord after which an edge portion of an adjacent fabric member is folded over the cord reinforced edge of the first fabric member so that the body of the adjacent panel extends generally in side by side relationship with the first fabric member. Thereafter, the fabric members and cord are sewn together. The joined fabric members are subsequently extended outwardly in a plane and thereby the fabric layers are both threadingly and frictionally secured relative to one another.

It is a primary object of the present invention to provide a method of forming a reinforced seam for joining a plurality of fabric panels or members in assembled relationship to form a structure wherein the seams between adjacent panels are strong enough to resist forces and stresses such as encountered with the deployment of sea anchors, drogue chutes, parachutes, tents, and the like.

It is another object of the present invention to provide a method of joining fabric panels in an assembled relationship using conventional commercial sewing machines wherein the seams between adjacent panels are formed so that all material lies outside the throat area of the sewing machine during stitching so that any number of separate panel members may be joined in end to end relatonship without regard to the bulk of material which might otherwise prevent the use of the standard or conventional sewing machine due to the confining characteristics of the generally small throat area of a conventional sewing machine.

It is yet another object of the present invention to provide a seam which is reinforced with a cord member and which has a particular utility in joining a plurality of fabric panels in assembled relationship wherein the cord member may function as a bail member or tie down member which distributes forces along the length of the seam and which will resist failure of the seam by any forces placed along the length of the cord member to a greater degree than is possible using conventional seam forming techniques.

It is another object of the present invention to form a seam for joining a plurality of adjacent fabric members wherein two layers of cloth are joined at the same to a reinforcing cord in such a manner that the fabric members are held both by the thread forming the stitch as well as by a frictional engagement of the fabric members with the cord member which frictional engagement is increased as the fabric members are urged apart from one another along the line of the seam.

BRIEF DESCRIPTION OF THE DRAWINGS

FIG. 1 is a partial illustration of a section of a sea anchor showing a plurality of bail ropes which are incorporated into the seams of the anchor using the method of the present invention.

FIG. 2 is a fragmented top plan view of one panel member showing the bail ropes secured along the seam.

FIG. 3 is a fragmented bottom plan view showing the panel and bail rope of the panel to be sewn to 11a, and designated as 11b.

FIG. 4 is a cross-sectional view taken along lines 4—4 of FIG. 3 showing both the elongated and leg portions of the bail rope.

FIG. 5 is a fragmented top plan view showing an adjacent panel being secured to the bail rope and panel of FIG. 2 as such panels are oreinted in overlapping relationship for introduction into a conventional commercial sewing machine.

FIG. 6 is a fragmented top plan view showing the overlapped panel of FIG. 5 extended after the panels are joined by a completed seam.

FIG. 7 is a cross-sectional view taken along lines 7—7 of FIG. 5 at a point spaced from the end of the leg portion of the bail rope or cord.

FIG. 8 is a cross-sectional view taken along 8—8 of FIG. 6.

DESCRIPTION OF THE PREFERRED EMBODIMENT

As previously discussed, the method of forming a seam as taught by the present invention is particularly adaptable for use in making reinforced seams for objects which must resist large stress and other forces such as encountered in the deployment of parachutes, sea anchors, drogue chutes, and the like. In this regard, the present method of forming the seam is also contemplated for use in such environments as tent making, where the reinforced seams resist and distribute stresses created on the tie down or looped extensions or bails which are used to peg the tent to the ground.

With specific reference to FIG. 1, there is disclosed a portion of one end of a sea anchor 10 which is formed from a plurality of generally triangular panels 11a, 11b, 11c, and 11d. The resultant sea anchor structure would be generally circular having an opening centrally thereof which is designated at 12 into which a plurality of bail ropes 13 are extended to form a plurality of loops 14 through which various tie lines or other members may be extended and/or secured.

With particular reference to FIGS. 2 and 3, the edge of panels 11a and 11b are shown in top and bottom plan view respectively. In preparing panels 11a and 11b to be joined to one another the bail rope or cord 13 is first secured thereto by folding an edge portion 15 of the panel member over an elongated portion 16 of the cord and thereafter stitching the folded over portion of the panel to the elongated portion of the cord or rope to form a seam 17 as shown in FIG. 4. In order to create the looped portion 14 in the bail member, a leg portion 18 thereof is extended generally parallel with the initial seam 17 with the extended portion being placed over the outermost edge portion 19 of the folded edge portion 15 of the panel member. Therefore, a second line of stitching 20 is made to join the leg portion and the panel member. In this manner, the folded over material portion 15 is secured by lines of stitches 17 and 20 to both the main body portion 16 of the bail rope or cord 13 and to the extended portion 8 thereof.

As previously discussed, one of the objectives of the present invention is to permit the joining of numerous sections of adjacent panel members by using conventional commercial sewing machines. In order to construct a sound seam having sufficient strength to be used in constructing parachutes, drogue chutes, sea anchors, and the like, the panel member 11a is first stitched to the bail cord or rope as shown in FIGS. 2 through 4. Thereafter the left-handed edge 22 (as shown in FIG. 1) of the adjacent panel 11b is folded over as shown at 23 in FIG. 5 so that a portion of the panel member 11b surrounds the edge portion 15 and cord portions 16 and 18 which are secured to panel 11a. It should be noted that the left handed edge 22 of panel 11b is oriented to the right in the bottom plan views of FIG. 3. With the folded edge portion 23 of the adjacent panel member 11b folded around the edge portion 15 of panel 11a, the remaining portion of panel 11b is extended beneath panel 11a as shown in FIG. 5. In this manner, there is no material which is disposed to the right of the folded portion of the panel members so that there is no material which can be obstructed by the throat portion of a conventional sewing machine. The throat portion of a conventional sewing maching being defined as that portion between the needle and the drive motor. The throat portion would be positioned to the right of the material shown in FIG. 5.

With particular reference to FIG. 7, once the two adjacent panels 11a and 11b are in the overlapping relationship shown in FIG. 5, a line of stitches is made as shown at 25 along the length of the cord portion 16 simultaneously joining the panels to the cord. The line of stitching 25 is shown as being generally parallel with the line of stitching 17. As the line of stitching 25 is made joining panel members 11a and 11b, the cord portion 16 will be compressed somewhat so that the cross section of the cord becomed elongated as opposed to circular. Once the line of stitching 25 has been made joining the panels, panel 11b is extended outwardly into generally the same plane as panel 11a thereby reorienting the line of stitching 25 as shown in FIG. 8 so that such line of stitching now extends generally horizontally or parallel with respect to panel members 11a and 11b. As shown in FIG. 8, a portion of the circumference or outer surface of the elongated portion 16 of the bail rope which is spaced or remote from the leg portion 18 thereof will not be wrapped or fully enclosed by the fabric panels 11a and 11b. In the event another panel such as 11c is to be joined to panel 11b, the edge portion 22' of the panel member 11c will be folded over so that a portion of panel 11c surrounds the edge 15 of panel member 11b. Thereafter, panels 11b and 11c may be joined in the same manner as described with respect to panels 11a and 11b.

As previously discussed, the seam forming technique of the present invention utilizes both the strength of the thread forming the seam as well as frictional forces created between the bail or cord and the fabric layers to add strength to the seam. With particular reference to FIG. 8, when tension is applied to the fabric panels 11a and 11b urging them apart with respect to one another, the stitching 25 will bind the material panels on either side of the cord as shown at 30 and 31 while the cord or rope will compress the fabric layers or panels creating a frictional engagement between the fabric layers which frictional force will combine with the binding strength of the stitching to provide an improved seam construction.

By way of example, a sea anchor constructed using the seam forming technique of the present invention may be made by joining adjacent panels of a dacron polyester material using a nylon or polyester thread to form the stitches. A suitable dacron polyester may be a 7 oz. cloth and the cord may typically be approximately 5/16 of an inch in diameter. When constructing a seam in accordance with the present invention using the aforementioned materials, it has been found that it is possible to exert forces in excess of 800 lbs. on each bail rope without failure of the seam. Also, as previously discussed, the seam forming technique of the present invention may be used to form a number of different articles wherein reinforced seams are beneficial. Such other structures may include sails, tents and particularly seams in tent tie downs, parachutes, drogue chutes and the like. The weight of the material and of the cord member will, of course, depend upon the desired use of the structure with parachute type strucutres being fabricated of lighter weight materials and the sea anchor type structures being fabricated of the heavier materials.

From the foregoing, a method of constructing cord reinforced seams for joining a plurality of panels in an assembled relationship has been disclosed where even relatively large structures may be sewn together utilizing conventional sewing machines. The method of sewing the reinforced seams makes it possible for all the panels to be disposed away from the throat area of the sewing machine as they are sewn together. Thereafter, the joined panels are reoriented thereby rotating the seams and binding the joined panels at two points while the cord reinforcing member disposed between the two points of the stitch creates a frictional engagement between the overlapping panels. The resultant seam exhibits superior strength and durability over other seaming techniques.

What is claimed is:

1. A seam for joining a plurality of separate fabric members into a composite structure comprising at least first and second fabric panels having first and second spaced edges, said first edge of said first fabric panel being folded so as to create a first folded edge portion having upper and lower fabric layers, cord means having at least an elongated portion disposed within the extending along said first folded edge portion of said first fabric panel, a first line of stitching extending through said upper and lower fabric layers of said first panel and said elongated portion of said cord means thereby joining said upper and lower fabric layers on generally opposite sides of said cord means, said second edge of said second panel being folded to create a second folded edge portion having upper and lower fabric layers, said first folded edge portion of said first fabric panel and said elongated portion of said cord means and said first line of stitching being disposed between said upper and lower fabric layers of said second folded edge portion of said second fabric panel, another line of stitching passing through and joining said first and second folded edge portions of said first and second fabric panels and said elongated portion of said cord means, said first and second fabric panels being joined with one another and said elongated portion of said cord means so that said second edge of said first fabric panel is extendable outwardly on a generally opposite side of said elongated portion of said cord means from said first edge of said second fabric panel.

2. The seam construction of claim 1 in which said another line of stitching is oriented generally parallel to the portions of said first and second fabric panels which are intermediate said first and second folded edge portions thereof when said first and second fabric panels are oriented outwardly with respect to one another in substantially the same plane.

3. The seam construction of claim 1 in which said first edge portions of said first fabric panel and said second edge portions of said second fabric panel extend only partially around the circumference of at least a portion of the length of said elongated portion of said cord means.

4. The seam construction of claim 3 in which said cord means includes a leg portion which is integrally connected to said elongated portion thereof through a loop configuration, and a second line of stitching connecting said upper and lower fabric layers of said first folded edge portion of said first fabric panel to said leg portion of said means.

5. A method for forming seams for connecting first and second fabric members in a joined relationship with one another and a reinforcing cord using thread comprising the steps of:

(a) Folding an edge portion of the first fabric member so as to create an elongated fold having upper and lower layers;

(b) Extending the cord within said elongated fold in said edge portion of the first fabric member and securing the same therein by a first line of stitching which passes through the upper and lower layers of the elongated fold and the cord;

(c) Folding an edge portion of the second fabric member over said elongated folded edge portion of said first fabric member so that the fabric members extend in an overlapping and generally parallel relationship to one another;

(d) joining said folded edge portion of the second fabric member with said elongated folded edge portion of the first fabric member and the cord with a second line of stitching which extends generally parallel to the first line of stitching to thereby unite said first fabric member, said second fabric member, and the cord; and (e) Extending the second fabric member outwardly from said overlapping relationship relative to said first fabric member so that said first and second fabric members are generally in coplanar relationship with one another.

* * * * *